US009588008B2

(12) United States Patent
Liao et al.

(10) Patent No.: US 9,588,008 B2
(45) Date of Patent: Mar. 7, 2017

(54) AUTOMOBILE TURBOCHARGER EXAMINATION DEVICE

(71) Applicants: Ying-Chieh Liao, Taichung (TW); Yu-Kuo Liao, Taichung (TW)

(72) Inventors: Ying-Chieh Liao, Taichung (TW); Yu-Kuo Liao, Taichung (TW)

( * ) Notice: Subject to any disclaimer, the term of this patent is extended or adjusted under 35 U.S.C. 154(b) by 173 days.

(21) Appl. No.: 14/645,861

(22) Filed: Mar. 12, 2015

(65) Prior Publication Data

US 2016/0266000 A1 Sep. 15, 2016

(51) Int. Cl.
*G01M 3/02* (2006.01)
(52) U.S. Cl.
CPC .................... *G01M 3/025* (2013.01)
(58) Field of Classification Search
CPC .................................................. G01M 3/025
USPC ................................. 73/114.76, 114.77, 49.7
See application file for complete search history.

(56) References Cited

U.S. PATENT DOCUMENTS

| | | | | | |
|---|---|---|---|---|---|
| 1,389,909 | A | * | 9/1921 | Skinner | G01L 23/24 116/142 R |
| 3,852,996 | A | * | 12/1974 | Klaubert | G01M 3/26 73/40.5 R |
| 4,878,347 | A | * | 11/1989 | Kawamura | F02B 37/10 290/52 |
| 7,104,120 | B2 | * | 9/2006 | Gladden | F01D 21/003 73/114.77 |
| 8,661,876 | B2 | * | 3/2014 | Malone | G01M 3/025 73/114.77 |
| 8,701,477 | B2 | * | 4/2014 | Malone | F02D 41/221 73/114.77 |
| 8,850,878 | B2 | * | 10/2014 | Flynn | F02D 41/221 73/114.77 |
| 9,032,787 | B2 | * | 5/2015 | Peters | F01N 11/00 73/114.01 |
| 2012/0260724 | A1 | * | 10/2012 | Lee | G01M 15/106 73/114.76 |
| 2013/0340514 | A1 | * | 12/2013 | Tobita | G01M 15/106 73/114.76 |
| 2014/0144221 | A1 | * | 5/2014 | Malone | G01M 3/025 73/114.77 |

* cited by examiner

*Primary Examiner* — John Fitzgerald
(74) *Attorney, Agent, or Firm* — Muncy, Geissler, Olds & Lowe, P.C.

(57) ABSTRACT

An automobile turbocharger examination device is provided. A connection tube set connects an outlet tube of a turbocharger and an inlet tube of an engine to define a detection channel which includes a hard tube portion and a flexible tube portion which is provided for being connected among the hard tube portion, the outlet tube and the inlet tube. The examination device is for being connected between the hard and flexible tube portions. A first connection end of a connection tubular body includes at least one connection tube. One of the at least one connection tube of the first connection end is for being communicably connected with the flexible tube portion, and a second connection end of the connection tubular body is for being communicably connected with the hard tube portion. A pressure-detecting channel is for detecting pressure.

10 Claims, 7 Drawing Sheets

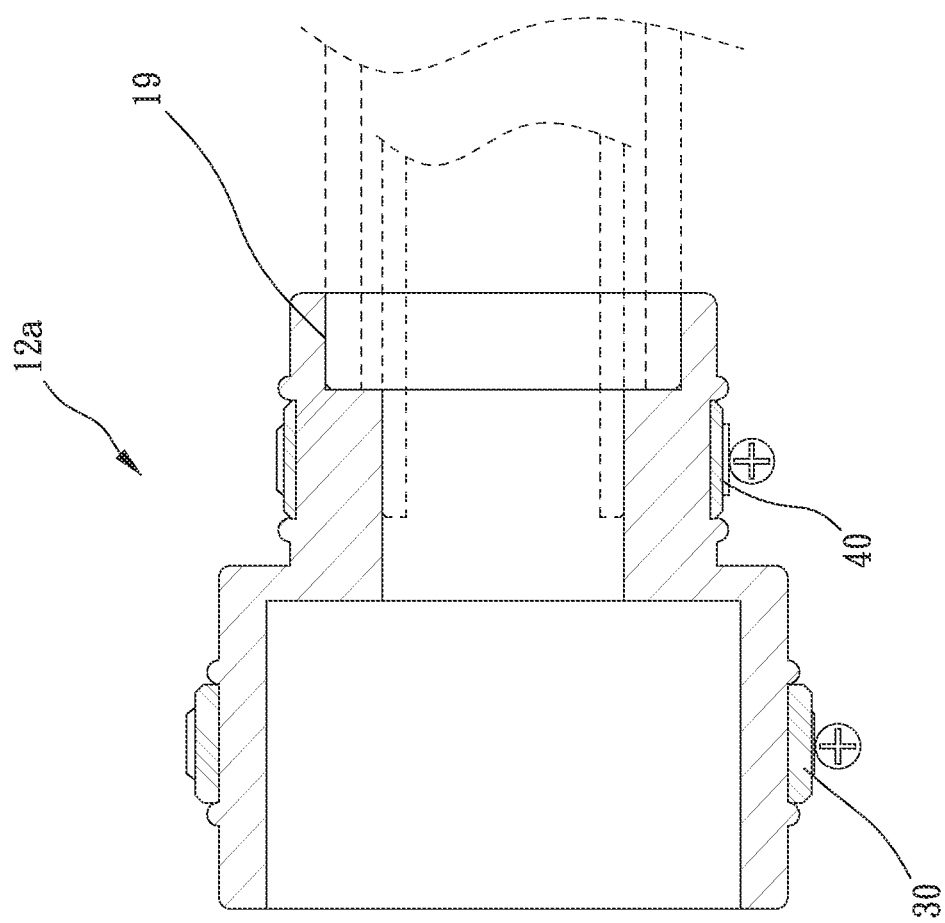

US 9,588,008 B2

AUTOMOBILE TURBOCHARGER EXAMINATION DEVICE

BACKGROUND OF THE INVENTION

Field of the Invention

The present invention relates to an examination device, and more particularly to an automobile turbocharger examination device.

Description of the Prior Art

Usually, to detect the pressure in an interior of a turbocharger or to examine if there are leaks in the interior of the turbocharger, a tube plug is needed to be plugged in an inlet or an outlet of the turbocharger to make the interior of the turbocharger a closed room. Then, the detection is conducted through making the interior of the turbocharger a vacuum room or ventilating air into the interior of the turbocharger.

At present, the tube plug is a solid tube plug, and this kind of design has high cost, and the solid structure makes the tube plug overweight and non-flexible. A tube plug can only be used on the turbochargers having openings of the same dimension, so it is inconvenient for users. More importantly, in the above-mentioned prior art, tube members connected with the inlet and the outlet of the turbocharger need to be disassembled before the examination is conducted; therefore, it is inconvenient for users, and the tube members are easily damaged during the process of disassembling. In addition, the examination is not in real time and not in a real situation, so the pressure state when the turbocharger functions is unable to be detected accurately.

The present invention has arisen to mitigate and/or obviate the afore-described disadvantages.

SUMMARY OF THE INVENTION

The major object of the present invention is to provide an automobile turbocharger examination device which can detect a pressure state of a turbocharger in real time. The automobile turbocharger examination device is easy to be assembled, disassembled or replaced, so it is convenient for users, and members are not damaged easily.

To achieve the above and other objects, the automobile turbocharger examination device is provided for detecting a turbocharger. The turbocharger has an outlet tube, and a connection tube set is connected between the outlet tube and an inlet tube of an engine. The connection tube set, the outlet tube and the inlet tube define a detection channel, and the detection channel includes a hard tube portion and a flexible tube portion which is provided for being connected with the hard tube portion, the outlet tube and the inlet tube. The automobile turbocharger examination device is provided for being connected with the detection channel and includes a connection tubular body and a pressure-detecting channel. The connection tubular body has a first connection end and a second connection end corresponding to the first connection end and an interior channel penetrating through the first and second connection ends. The first connection end is relatively harder, and the second connection end is relatively softer. The first connection end includes at least one connection tube, and one of the at least one connection tube of the first connection end is communicably connected with the flexible tube portion, and the second connection end is communicably connected with the hard tube portion. The pressure-detecting channel communicates with the interior channel and is provided for detecting pressure.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 7 is drawing of another preferred embodiment of the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
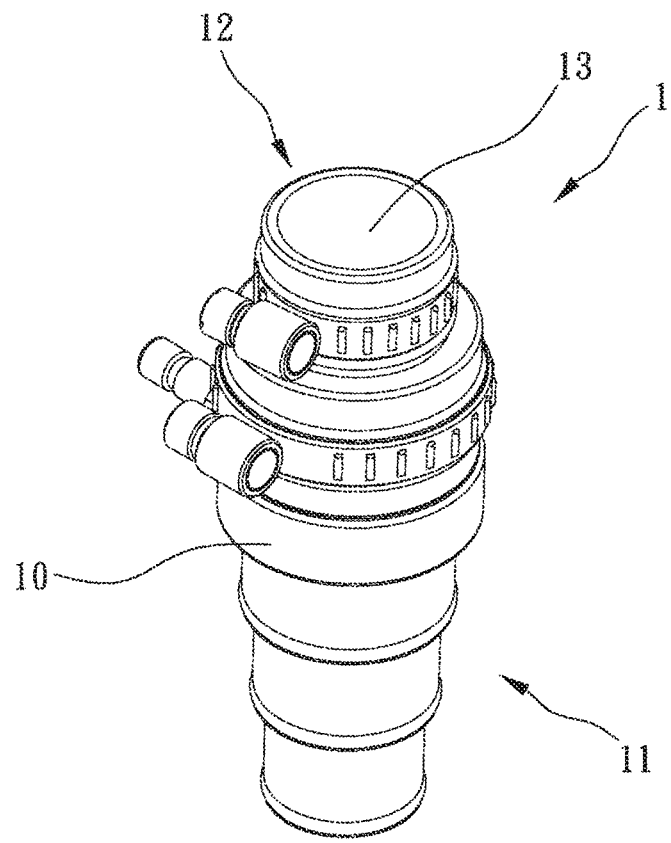
FIG. 1 is a perspective view of a preferred embodiment of the present invention.
Figure 2:
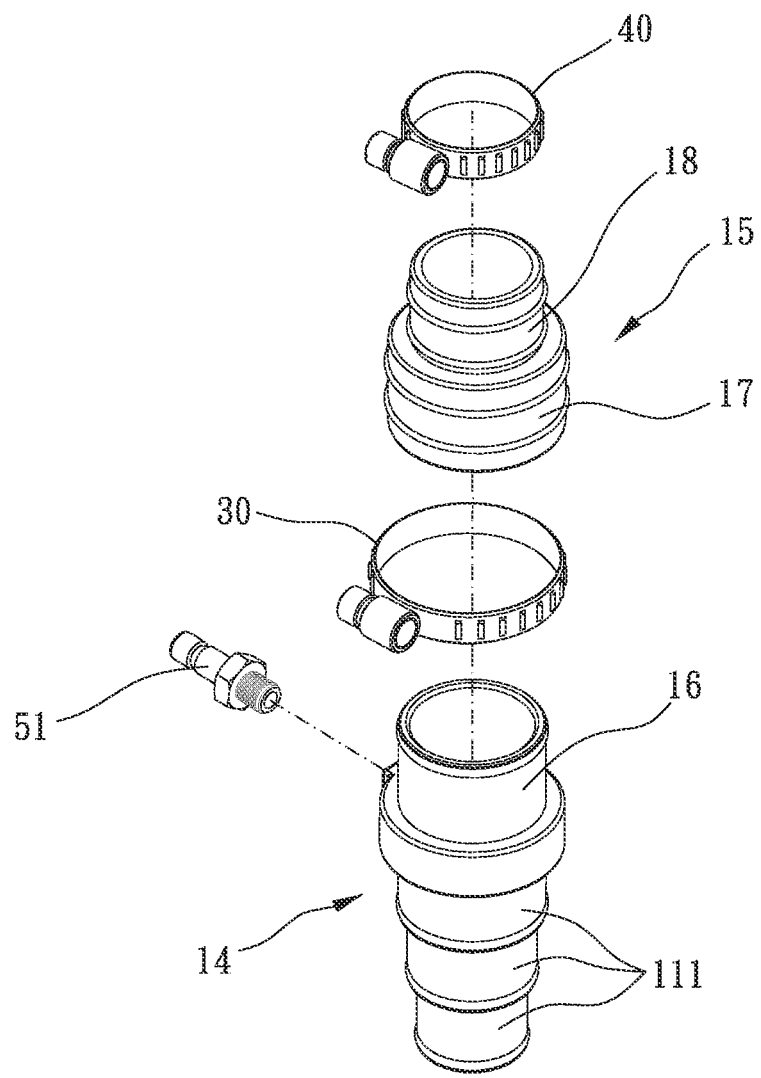
FIG. 2 is a breakdown drawing of the preferred embodiment of the present invention.
Figure 3:
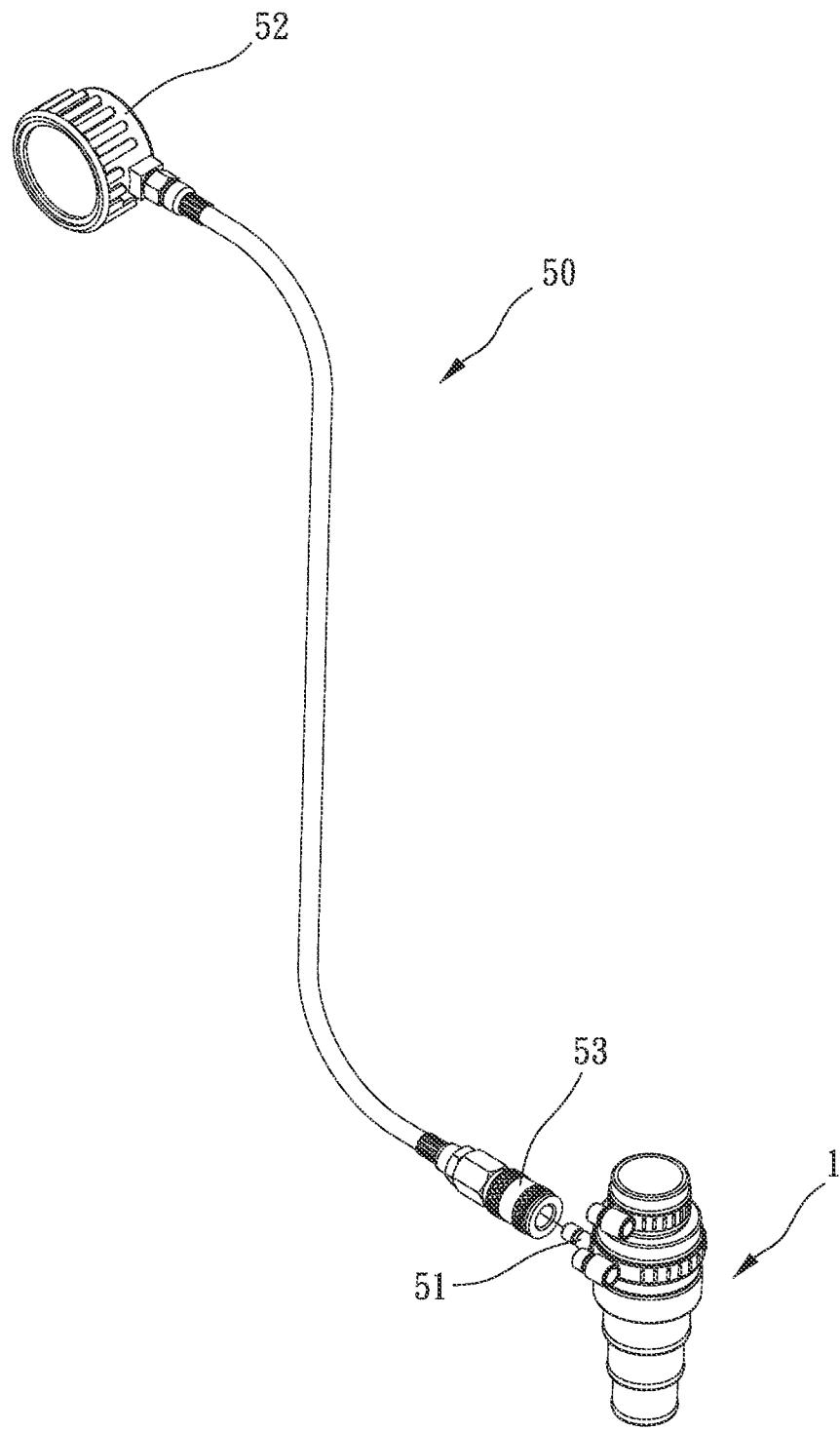
FIGS. 3 and 4 are assembly sketches of the preferred embodiment of the present invention.
Figure 4:
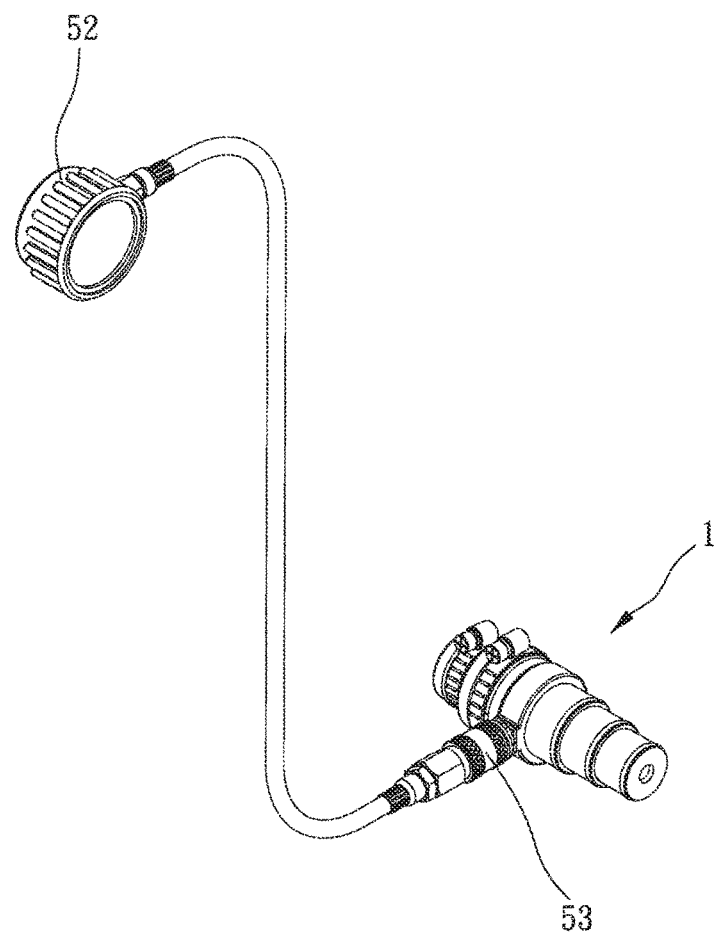
Figure 5:
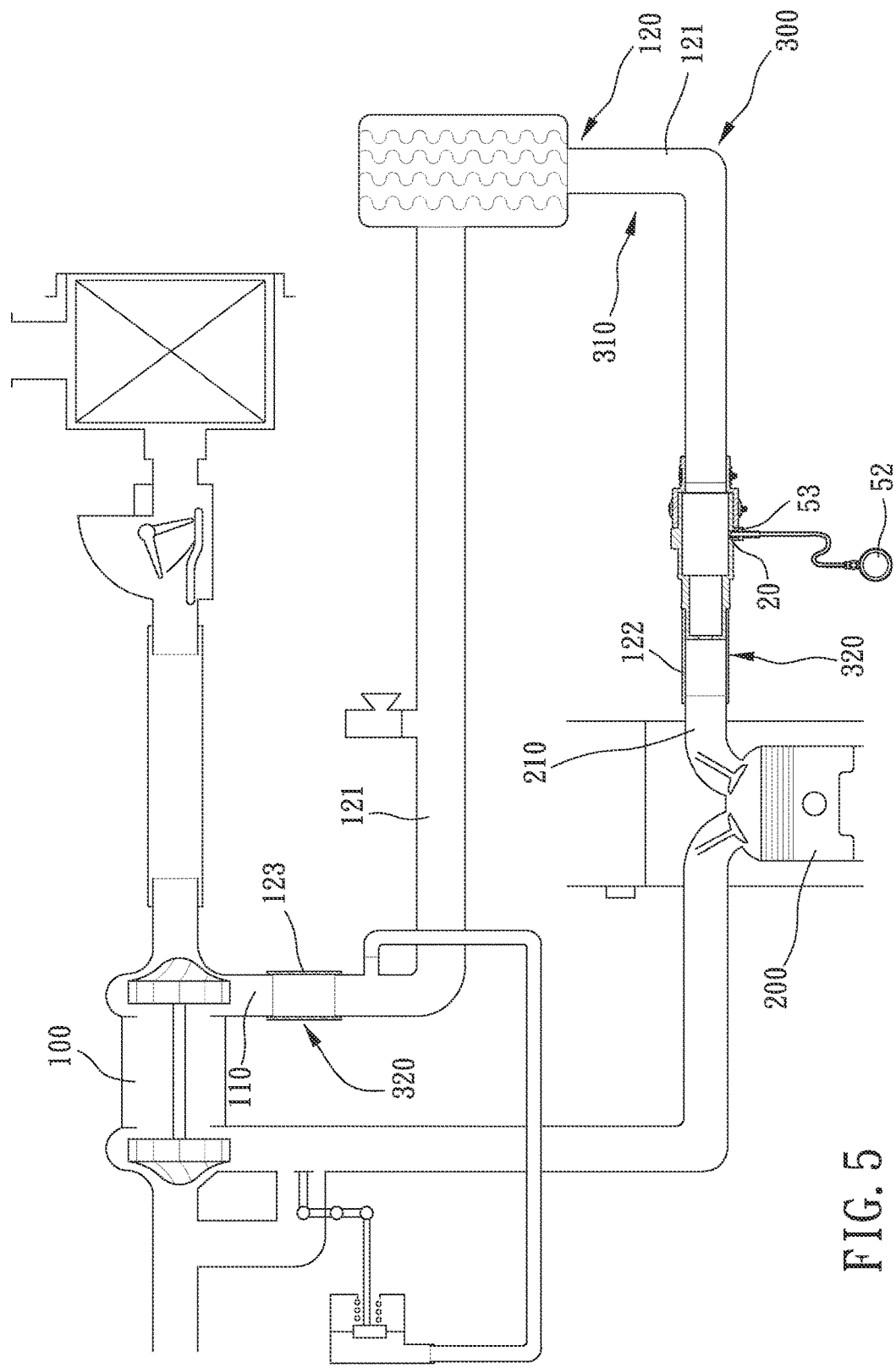
FIG. 5 is a drawing showing an application of the preferred embodiment of the present invention.
Figure 6:
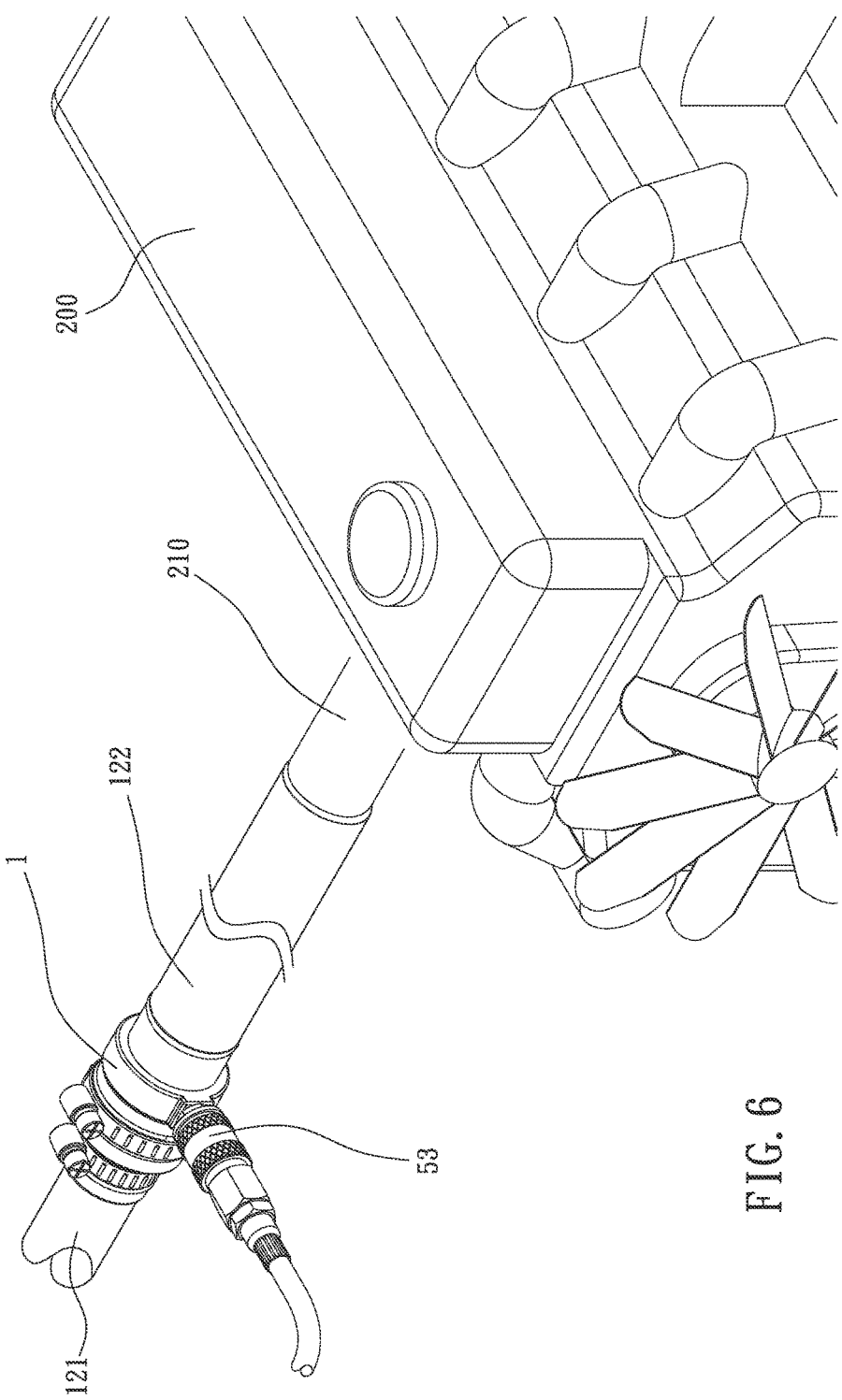
FIG. 6 is a sketch of the preferred embodiment of the present invention in use.

Please refer to FIG. 1 to FIG. 6 for a preferred embodiment of the present invention. The automobile turbocharger examination device 1 is provided for examining a turbocharger 100, and the turbocharger 100 has an outlet tube 110. A connection tube set 120 is connected between the outlet tube 110 and an inlet tube 210 of an engine 200. The connection tube set 120, the outlet tube 110 and the inlet tube 210 define a detection channel 300, and the detection channel 300 includes a hard tube portion 310 and a flexible tube portion 320 which is provided for being connected among the hard tube portion 310, the outlet tube 110 and the inlet tube 210. The automobile turbocharger examination device 1 is provided for being connected with the detection channel 300. Specifically, the connection tube set 120 includes a hard tube member 121 (for example, an aluminum tube, a hard plastic tube or other similar objects) and two flexible tube members 122, 123 (for example, a rubber tube, a flexible plastic tube or other similar objects) connected among two ends of the hard tube member 121, the outlet tube 110 and the inlet tube 210, wherein the hard tube member 121, the outlet tube 110 and the inlet tube 210 form the hard tube portion 310, and the two flexible tube members 122, 123 form the flexible tube portion 320.

The automobile turbocharger examination device 1 includes a connection tubular body 10 and a pressure-detecting channel 20. The connection tubular body 10 has a first connection end 11 and a second connection end 12 corresponding to the first connection end 11 as well as an interior channel 13 penetrating through the first and second connection ends 11, 12. The first connection end 11 is relatively harder, and the second connection end 12 is relatively softer. The first connection end 11 is relatively harder than the flexible tube portion 320, and the second connection end 12 is relatively softer than the hard tube portion 310 so as to closely tight fit to the flexible tube portion 320 and the hard tube portion 310. The first connection end 11 includes at least one connection tube 111, and one of the at least one connection tube 111 of the first connection end 11 is provided for being communicably connected with the flexible tube portion 320. The second connection end 12 is provided for being communicably connected with the hard tube portion 310. In this embodiment, the first connection end 11 includes three connection tubes 111 which are steppedly sequentially connected and provided for being tightly abuttingly inserted in the flexible tube portion 320 via one of the at least one connection tube 111 of the first connection end 11, so the first connection end 11 is adaptable to the flexible tube portion 320 or other flexible tubes in different dimensions to provide preferable air-tight effect. The second connection end 12 is provided for being elastically and tightly disposed around outside the hard tube portion 310.

In this embodiment, the connection tubular body 10 includes a first barrel member 14 and a second barrel member 15, and the first barrel member 14 is relatively harder than the second barrel member 15. The first barrel member 14 can be made of, for example, a metal tube, a hard plastic tube or other similar objects, and the second barrel member 15 can be made of, for example, a rubber tube, a flexible plastic tube or other similar objects. Two opposite ends of the first barrel member 14 are formed with the first connection end 11 and a connection head 16 respectively. The first barrel member 14 has the pressure-detecting channel 20, and the second barrel member 15 is detachably disposed around outside the connection head 16 and formed with the second connection end 12. Moreover, the connection tubular body 10 can be integrally formed. Preferably, a first restriction member 30 adjustably restricts the second barrel member 15 to the connection head 16 so as to ensure air-tightness. Specifically, an outer circumferential face of the second connection end 12 is surroundingly formed with a first annular recess 17, and the first restriction member 30 is disposed around the first annular recess 17 and restricts the second barrel member 15 to the connection head 16. The outer circumferential face of the second connection end 12 is further surroundingly formed with a second annular recess 18. Preferably, a second restriction member 40 is adjustably disposed around the second annular recess 18 and provided for restricting the second connection end 12 to the hard tube portion 310 so as to ensure air-tightness.

The pressure-detecting channel 20 communicates with the interior channel 13 and is provided for detecting pressure. Specifically, the pressure-detecting channel 20 is further communicably connected with a pressure-detecting unit 50, and the pressure-detecting unit 50 includes an adaptor 51 which is communicably connected with the pressure-detecting channel 20 and a pressure-detecting assembly 52 which is detachably connected with the adaptor 51. The adaptor 51 can be screwed to the pressure-detecting channel 20, and the pressure-detecting assembly 52 can be connected with the adaptor 51 via a quick release connector 53.

In actual practice, in this embodiment, the connection tube 111 of the first connection end 11 of the connection tubular body 10 is inserted in an end of the flexible tube member 122, and the second connection end 12 of the connection tubular body 10 is disposed at an end of the hard tube member 122. Therefore, when a car is started, the turbocharger 100 compresses air to make air enter the engine 200 through the detecting channel 300, and the pressure-detecting unit 50 can detect an air pressure in the detecting channel 300 via the pressure-detecting channel 20 and further detect if the turbocharger 100 and/or the connection tube set 120 functions normally.

In the embodiment shown in FIG. 7, a second connection end 12a of the connection tubular body 10 can be formed with a connection opening 19 having a plurality of radial dimensions for being connected to the hard tube portion in different dimensions.

It is noted that the connection tube 111 of the first connection end 11 of the connection tubular body 10 can be inserted in an end of the flexible tube member 122, and the second connection end 12 of the connection tubular body 10 can be connected with the inlet tube 210; or that the connection tube 111 of the first connection end 11 of the connection tubular body 10 can be inserted in an end of the flexible tube member 123, and the second connection end 12 of the connection tubular body 10 can be connected with an end of the hard tube member 121; or that the connection tube 111 of the first connection end 11 of the connection tubular body 10 can be inserted in an end of the flexible tube member 123, and the second connection end 12 of the connection tubular body 10 can be connected with the outlet tube 110.

Given the above, the automobile turbocharger examination device of the present invention can be connected with a communication channel between the outlet tube of the turbocharger and the inlet tube of the engine. In actual examination, the present invention can detect the pressure state when the turbocharger is functioning and if there are leaks in the turbocharger. Furthermore, there is no need to disassemble the tube members connected with the inlet and outlet tubes of the turbocharger when the examination is conducted, so the examination is easy to conduct and uneasy to cause damage.

In addition, the first and/or second connection ends of the connection tubular body can be further designed as connection portions having different dimensions for being adapted to the flexible and hard tube portions in different dimensions. Furthermore, the connection tubular body can be designed as a detachable two-piece structure which is convenient to be assembled, disassembled and replaced.

While we have shown and described various embodiments in accordance with the present invention, it should be clear to those skilled in the art that further embodiments may be made without departing from the scope of the present invention.

What is claimed is:

1. An automobile turbocharger examination device provided for detecting a turbocharger, the turbocharger having an outlet tube, a connection tube set connected between the outlet tube and an inlet tube of an engine, the connection tube set, the outlet tube and the inlet tube defining a detection channel, the detection channel including a hard tube portion and a flexible tube portion which is provided for being connected among the hard tube portion, the outlet tube and the inlet tube, the automobile turbocharger examination device provided for being connected with the detection channel and including:

a connection tubular body, having a first connection end and a second connection end corresponding to the first connection end as well as an interior channel penetrating through the first connection end and the second connection end, the first connection end being relatively harder, the second connection end being relatively softer, the first connection end including at least one connection tube, one of the at least one connection tube of the first connection end provided for being communicably connected with the flexible tube portion, the second connection end provided for being communicably connected with the hard tube portion;

a pressure-detecting channel, communicating with the interior channel and being provided for detecting pressure.

2. The automobile turbocharger examination device of claim 1, wherein the first connection end is relatively harder than the flexible tube portion, and the second connection end is relatively softer than the hard tube portion.

3. The automobile turbocharger examination device of claim 1, wherein one of the at least one connection tube of the first connection end is provided for being tightly abuttingly inserted in the flexible tube portion, and the second connection end is provided for being tightly disposed around outside the hard tube portion.

4. The automobile turbocharger examination device of claim 1, wherein an outer circumferential face of the second connection end is surroundingly formed with a second annular recess, and a second restriction member is disposed around the second annular recess and provided for restricting the second connection end to the hard tube portion.

5. The automobile turbocharger examination device of claim 1, wherein the second connection end of the connection tubular body is a connection opening having a plurality of radial dimensions.

6. The automobile turbocharger examination device of claim 1, wherein the pressure-detecting channel is further communicably connected with a pressure-detecting unit.

7. The automobile turbocharger examination device of claim 6, wherein the pressure-detecting unit includes an adaptor which is communicably connected with the pressure-detecting channel and a pressure-detecting assembly which is detachably connected with the adaptor.

8. The automobile turbocharger examination device of claim 1, wherein the connection tubular body includes a first barrel member and a second barrel member, the first barrel member is relatively harder than the second barrel member, two opposite ends of the first barrel member are formed with a first connection end and a connection head respectively, and the second barrel member is detachably disposed around outside the connection head and has the second connection end.

9. The automobile turbocharger examination device of claim 8, wherein a first restriction member restricts the second barrel member to the connection head.

10. The automobile turbocharger examination device of claim 9, wherein an outer circumferential face of the second connection end is surroundingly formed with a first annular recess, and the first restriction member is disposed around the first annular recess and restricts the second barrel member to the connection head.

* * * * *